(12) United States Patent
Kistner et al.

(10) Patent No.: US 6,337,471 B1
(45) Date of Patent: Jan. 8, 2002

(54) COMBINED SUPERPLASTIC FORMING AND ADHESIVE BONDING

(75) Inventors: Matthew G. Kistner, Irvine, CA (US); Jeffrey D. Will, Renton, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/556,752

(22) Filed: Apr. 21, 2000

Related U.S. Application Data

(60) Provisional application No. 60/130,869, filed on Apr. 23, 1999.

(51) Int. Cl.[7] .................................................. H05B 6/10
(52) U.S. Cl. ........................ 219/633; 219/635; 219/645; 219/659
(58) Field of Search ................................ 219/602, 603, 219/615, 617, 618, 632, 633, 634, 635, 645, 659, 121.6, 121.63; 228/157, 190, 193, 173.2; 156/272.2, 273.7, 273.9, 274.2

(56) References Cited

U.S. PATENT DOCUMENTS

| | | |
|---|---|---|
| 3,605,477 A | 9/1971 | Carlson |
| 3,920,175 A | 11/1975 | Hamilton et al. |
| 3,927,817 A | 12/1975 | Hamilton et al. |
| 4,117,970 A | 10/1978 | Hamilton et al. |
| 4,141,484 A | 2/1979 | Hamilton et al. |
| 4,622,445 A | 11/1986 | Matsen |
| 4,649,249 A | 3/1987 | Odor |
| 5,024,369 A | 6/1991 | Froes et al. |
| 5,420,400 A | 5/1995 | Matsen et al. |
| 5,599,472 A | 2/1997 | Brown et al. |
| 5,660,669 A | * 8/1997 | Mittleider ................. 156/273.7 |
| 5,683,608 A | 11/1997 | Matsen et al. |
| 5,705,794 A | * 1/1998 | Gillespie et al. ............ 219/615 |
| 5,760,379 A | * 6/1998 | Matsen et al. .............. 219/633 |
| 5,821,506 A | * 10/1998 | Matsen ....................... 219/615 |
| 5,914,064 A | * 6/1999 | Gillespie et al. ............ 219/615 |
| 5,994,666 A | 11/1999 | Buldhaupt et al. |

OTHER PUBLICATIONS

WO 97/27045 (PCT 96/20115) Metal Sandwich Structure With Integral Hardpoint, Jul. 31, 1997.

* cited by examiner

Primary Examiner—Tu Ba Hoang
(74) Attorney, Agent, or Firm—John C. Hammar

(57) ABSTRACT

We combine superplastic forming (SPF) with adhesive bonding (AB) to produce quality multisheet sandwich panel structures, especially those using a superplastic aluminum alloy, such as Al 2004, Al 8090, or Al 1570. We produce the parts with improved energy efficiency and at lower cost. We heat the multisheet pack having an adhesive, preferably a polyimide, between the core sheets and the face sheets to its superplastic forming range. Then, we superplastically form the pack to define adhesive bonds between the sheets in the core and between the core and the face sheets with the flowing adhesive. Finally, we cool the formed pack below the superplastic range to set the adhesive.

1 Claim, 2 Drawing Sheets

COMBINED SUPERPLASTIC FORMING AND ADHESIVE BONDING

REFERENCE TO RELATED APPLICATION

The present application claims the benefit of U.S. Provisional Patent Application 60/130,869, filed Apr. 23, 1999.

TECHNICAL FIELD

The present invention relates to superplastic forming (SPF) combined with adhesive bonding (AB) to form multisheet, expanded sandwich structures, especially 4-sheet aluminum alloy panels bonded with a polyimide adhesive.

BACKGROUND ART

Under certain conditions, some materials can be plastically deformed without rupture well beyond their normal limits. This property, called superplasticity, is exhibited by certain metals and alloys within limited ranges of temperature and strain rate. For example, titanium and its alloys are superplastic in the temperature range from about 1450–1850° F. (785–1010° C.).

Superplastic forming (SPF) is a technique for expanding or stretching metal that relies on superplasticity. A typical SPF process involves placing one or more sheets of metal in a die, heating the sheets to an elevated temperature within the superplastic range for that metal, and superplastically forming the sheet(s) at the SPF temperature. Expansion can and often does exceed 100%. Generally, a differential forming pressure from a gas manifold is injected between sealed sheets and is used as the driving force to stretch the sheet(s) into the desired shape against the shaped surfaces of supporting dies. SPF can be called "blow molding" insofar as it uses differential gas pressure to form the material. The differential pressure is selected and controlled to strain the material at a strain rate that is within its superplastic range. The following patents are illustrative of SPF processes and equipment:

| PATENT | TITLE | ISSUE DATE |
| --- | --- | --- |
| 3,920,175 | Method of SPF of Metals with Concurrent Diffusion Bonding | November 18, 1975 |
| 3,927,817 | Method for Making Metallic Sandwich Structures | December 23, 1975 |
| 3,605,477 | Precision Forming of Titanium Alloys and the Like by Use of Induction Heating | September 29, 1971 |
| 4,141,484 | Method of Making a Metallic Structure by Combined Flow Forming and Bonding | February 27, 1979 |
| 4,649,249 | Induction Heating Platen for Hot Metal Working | March 10, 1987 |
| 4,117,970 | Method for Fabrication of Honeycomb Structures | October 3, 1978 |
| 5,024,369 | Method to Produce Superplastically Formed Titanium Alloy Components | June 18, 1991 |

We incorporate these patents by reference.

One advantage of SPF is the forming of complex shapes from sheet metal while reducing the time and eliminating the waste of milling. SPF sandwich panel production results in a considerable cost saving and reduces total part count over conventional "built up" assemblies that are arranged and fastened together. In addition, the SPF process is generally applicable to single and multisheet fabrication. For multisheet fabrication, SPF is combined with joining processes, such as diffusion bonding, brazing, or laser welding, to produce complex sandwich structures. In the present invention, we join the sheets with adhesive bonding. The SPF process produces lighter, lower cost parts that use fewer fasteners. Use of SPF is accelerating for the manufacture of parts for aircraft, missiles, and spacecraft. In the present invention, we combine SPF with adhesive bonding to make multisheet sandwich panels, especially panels made from aluminum or its SPF alloys.

Titanium superplastically-formed/diffusion-bonded (SPF/DB) panel structures can cost 50% less than conventional honeycomb construction. The SPF/DB process can produce tailored rib or integral hard point and fastener through-hole structures, such as those described in published PCT Application US96/20115, which we also incorporate by reference.

In a typical prior art SPF process for titanium or its alloys, the sheet metal is placed between dies at least one of which has a contoured surface corresponding to the shape of the product. The dies are placed on platens, which are heated, generally using embedded resistive heaters. The platens heat the dies to about 1650° F. (900° C.). Because the titanium will readily oxidize at the elevated temperature, an inert gas, such as argon, surrounds the die and workpiece. The dies heat the sheet metal to the temperature range where the sheet metal is superplastic. Then, under applied differential pressure, the sheet metal deforms against the contoured surface.

The platens and dies have a large thermal mass. They take considerable time and energy to heat and are slow to change their temperature unless driven with high heat input or with active cooling. To save time and energy, the platens must be held near the forming temperature throughout a production run (i.e., the production of a number of parts using the same dies), so loading raw materials and unloading completed parts is a challenge. The raw sheet metal must be inserted onto the dies, and formed parts removed, at or near the elevated forming temperature. The hot parts must be handled carefully at this temperature to minimize bending. Within the SPF range, the SPF metals have the consistency of taffy, so bending can easily occur unless the operators take suitable precautions. Bending generally ruins the part because the part assumes the wrong aerodynamic shape or has unintended areas of stress concentration.

U.S. Pat. Nos. 4,622,445 and 5,683,608 describe improvements for an SPF process coupling the use of ceramic dies with induction heating. With an inductively heated SPF press or workcell, the sheet metal workpiece (or a susceptor surrounding the workpiece) is preferentially heated using an oscillating magnetic field without heating the platens or dies significantly. The ceramic dies are an insulator and retain heat induced in the part. Heating is easily controlled by stopping the induction. The part can cool relatively quickly even before removing it from the die. In Boeing's induction heating workcell, less energy is wasted because we do not heat significantly the large thermal mass of the platens and dies. Press operators need not work around hot dies and platens. Boeing also saves time and energy when changing dies to set up manufacture of different parts. The dies and platens are significantly cooler than those in a conventional SPF press, so they can be handled sooner, reducing the die change by several hours. Therefore, the induction heating process is an agile work tool for rapid prototyping or low rate production with improved efficiency and versatility. We also incorporate these patents by reference.

U.S. Pat. Nos. 3,920,175 and 3,927,817 describe typical combined cycles for SPF forming and diffusion bonding. Diffusion bonding is a notoriously difficult and temperamental process, especially for aluminum, that has forced many SPF fabricators away from multisheet manufacturing or to "clean room" production facilities and other processing tricks to eliminate the possibility of oxidation corrupting the bond. In addition, diffusion bonds are plagued with microvoids, which are difficult to detect nondestructively, but, if present, significantly diminish the structural performance of the joint. Even when it works, diffusion bonding is a time consuming process. The part typically must be held at elevated temperature and elevated pressure (about 400 psi) for several hours. For example, in U.S. Pat. No. 3,920, 175, the diffusion bonding operation takes five hours at 1650° F. (900° C.), making the complete cycle forming and bonding each part six hours. In U.S. Pat. No. 3,927,817, diffusion bonding occurs prior to forming, but still requires four to five hours, resulting in a six hour bonding/forming cycle where the temperature must be held at 1650° F. (900° C.) for the entire period. Typically a hot press diffusion bonding process for common titanium alloys used in aerospace applications will require eight hours or more at 2500 psi and 800° C. (1472° F.), about six hours at 400 psi and 900° C. (1650° F.), or about two hours at 250–300 psi and 950° C. (1742° F.). Producing this heat and pressure for this length of time is expensive. The equipment and facilities to house it are expensive. The consumption of resources is large. The process limits the rate of production and is far from lean or agile.

Another diffusion bonding process uses a CRES template to apply pressure in the desired locations in the multisheet part is described in U.S. patent application Ser. No. 08/721, 402. Titanium alloys especially are amenable to this improved SPF/DB process because they can be diffusion-bonded at relatively low contact pressures. Aluminum alloys have a stable $Al_2O_3$ surface film and low oxygen solubility, and require relatively high pressures for diffusion bonding. The template reduces the processing cycle by focusing pressure on the areas where diffusion bonds are intended.

U.S. Pat. No. 5,420,400 describes a timesaving process for combining SPF with brazing, an operation that promises higher quality parts at lower production costs than diffusion bonding, because there is higher confidence in the integrity of the brazed joint than a diffusion bond. The SPF-brazing process also provides significant energy savings and shorter production times. The induction heating press or workcell can rapidly change the temperature of the part on which it operates. The troubles of diffusion bonding are eliminated by replacing diffusion bonding with brazing so that a much more efficient manufacturing cycle is possible. Manufacturers have greater assurance in the integrity of the brazed bond, can achieve a satisfactory brazed bond quickly and reliably, and can process the multisheet pack with a single heating cycle without removing the pack from the press. Conventional processing requires a significantly higher investment in capital equipment and usually requires the use of separate equipment maintained at the different temperatures to produce parts that require multiple, elevated temperature manufacturing operations. Combined heating cycles, like that used for the SPF-brazing process, reduce hand labor, capital equipment cost, and energy consumption.

A combined process for superplastic forming (SPF) and brazing preferably begins by assembling a pack of SPF sheet metal sheets having braze alloy placed where braze joints will be located in the finished part. The pack is inductively heated to the superplastic forming range, and formed to define the braze joints. After forming, the temperature is increased to reach the brazing temperature or melting point of the braze alloy to allow the alloy to flow in the area of the braze joint. Cooling the part below the superplastic forming range sets the braze joint and completes the process.

Manufacture of SPF/DB laser welded (LW) parts is described in U.S. Pat. No. 5,994,666. Weld cratering and tight radii at the start and stop of the weld are inherent limitations of laser welding. They result from the high intensity, narrowly focused beam, and have in the past resulted in sharp termination points that were areas of concentrated stress. The laser naturally produces a "keyhole" weldment that forms a crater at the weld termination, severely undercutting the top sheet at the end point of a stitch weld. Such welds weaken the top sheet of the core stack at the weld termination at a point that experiences high stress during inflation by gas pressure during superplastic forming. The SPF/DB/LW production process eliminates these weak points at the beginning and terminating ends of the weld by using a traveling laser welding head having a pressure foot for pressing the sheets into intimate contact around the region of the weld to ensure good weld quality. Usually stop-off is applied to the sheet interface to prevent later diffusion bonding, and the sheets are laser-welded through the stop-off.

If sealed openings through the sandwich structure are needed for fasteners, fluid or electric lines, control cables, or the like, a laser weld may be made in the full pack before it is superplastically expanded to seal weld around the region where a hole will be cut. The hole can then be cut inside the seal weld to produce a sealed opening through the full pack. A reinforcing tube having a length equal to the height of the die cavity (i.e., the thickness of the completed panel) is placed in the hole, and the pack forms around the tube as it inflates. The sheets usually will diffusion bend to the tube. The resulting panel has reinforced sealed openings of the desired diameter in the sandwich structure. Hard points can be made in a similar process by including a solid block at a predetermined location.

SUMMARY OF THE INVENTION

The present invention combines superplastic forming (SPF) with adhesive bonding (AB) to form sandwich panel structures analogous in appearance and performance to SPF/DB panels. SPF/AB is particularly well suited for forming aluminum and its alloys, which are lower temperature processes using a material that is notoriously difficult to diffusion bond. In fact, the stable surface oxide and low oxygen solubility of aluminum alloys generally preclude diffusion bonding. Concurrent superplastic forming/ adhesive bonding (SPF/AB), however, is an acceptable alternative for aluminum and suitable, in some cases, as well for titanium. The adhesive flows during forming to produce structural bonds at all internal faying surfaces in a preferred embodiment. An air coolable, superplastic aluminum alloy and a low-volatile content/ low-viscosity adhesive with compatible forming / curing temperature and curing cycle time allow the combination of these processes. A four-sheet forming pack includes a laser welded two-sheet core separated from the face sheets by layers of adhesive. Processing conditions, especially selection of the processing temperature, balance the need for obtaining adequate superplasticity of the alloy with thermal stability of the adhesive.

This invention combines superplastic forming with adhesive bonding to produce multisheet sandwich structures. A polymer film is placed between the core sheets and the face sheets in a 4-sheet structure. The film becomes fluid during the superplastic forming process and with the assistance of the forming pressure bonds the core sheets and the face sheets creating a unitary assembly sandwich structure. Currently available aluminum SPF alloys can be superplastically formed at temperatures somewhat below 900° F. Certain polybenzimidazoles and polyamides can survive these temperatures without degradation. Degradation of polymers is accelerated in the presence of oxygen. Therefore, the use of an inert forming gas, such as argon, will improve the ability of the polymer to withstand the temperature required for the SPF process without degradation.

The SPF/AB process eliminates a tunnel void present in other multisheet structures where the sheets fold together around a weld or diffusion bond. The adhesive fills any such tunnel voids and, therefore, eliminates stress concentrations that are caused by tunnel voids.

DETAILED DESCRIPTION

Figure 1:
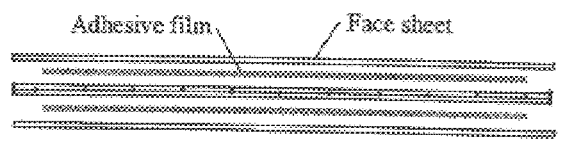
FIG. 1 is an elevation showing a typical arrangement of the metal sheets and adhesive to make an SPF/AB 4-sheet panel according to the present invention.
Figure 2:
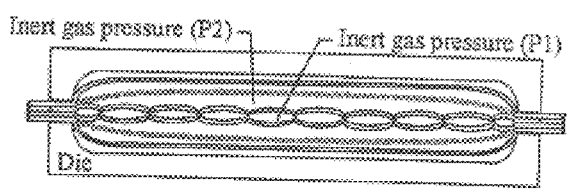
FIG. 2 is an elevation similar to FIG. 1 showing partial expansion of the laser welded core in the assembly of a 4-sheet panel.
Figure 3:
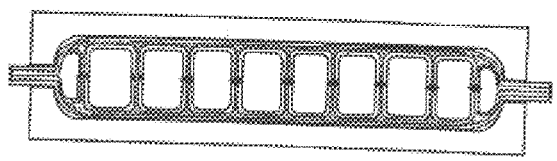
FIG. 3 is an elevation (i. e., cross-section) showing a fully expanded and bonded 4-sheet SPF/AB panel of the present invention.
Figure 4:
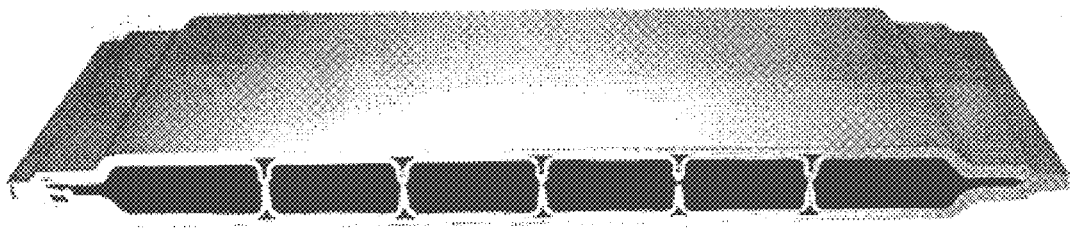
FIG. 4 is an isometric showing a section of a 4-sheet SPF/AB panel made during our trials.
Figure 5:
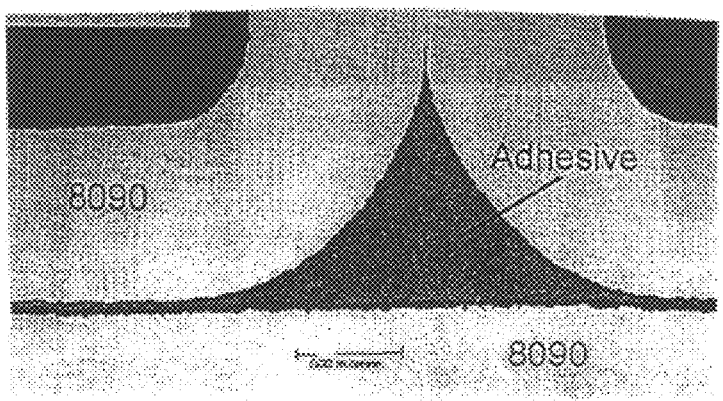
FIG. 5 shows a typical adhesive bond in an Al 8090 panel.
Figure 6:
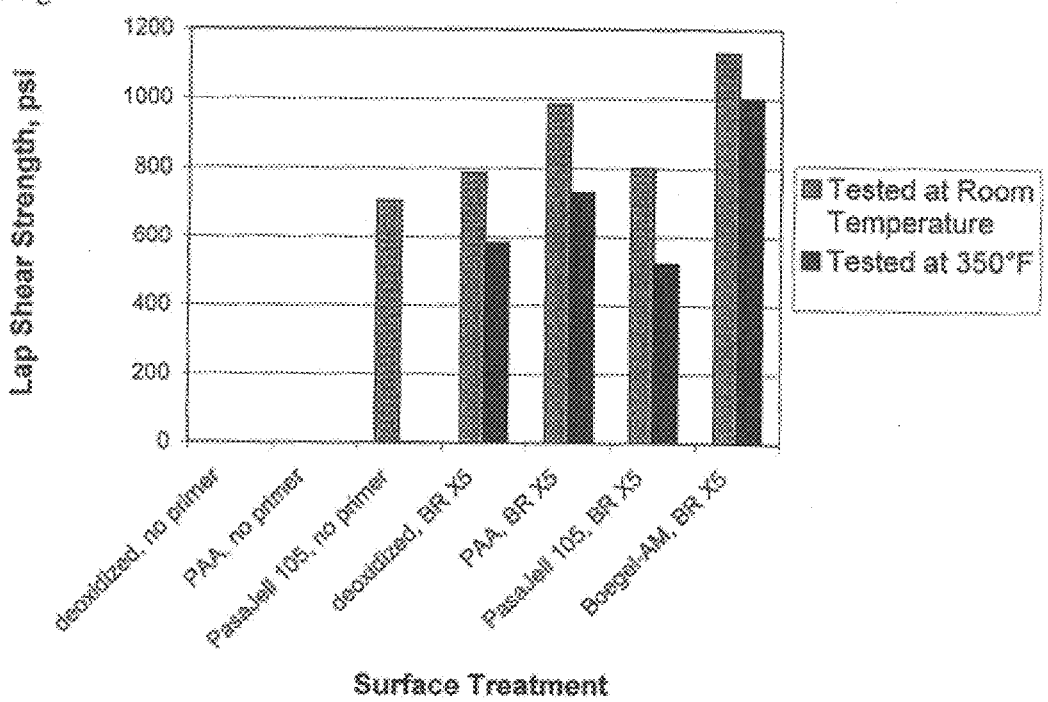
FIG. 6 shows lap shear strength (psi) for the specimens in Tables 4 and 5.

Our preferred SPF/AB process begins with laser or resistance welding (or otherwise connecting) 10 two core sheets 12 and 14 in a pattern for the intended reinforcing rib structure of the formed panel 16. Then adhesive film 18 and 20 is placed on both sides of the welded core sheets, and the entire assembly enclosed within two outer face sheets 22 and 24 to form a multisheet pack. Fittings are welded to permit pressurization and evacuation of the internal core/core and core/skin zones of the pack separately. The basic fabrication approach is analogous to superplastically formed, laser-welded and diffusion bonded (SPF/LW/DB) titanium panels described in U.S. Pat. No. 5,994,666.

Selection of an Adhesive

Thermoplastic adhesives are expected to be appropriate to avoid complications with competing cure and forming cycles. That is, a thermosetting polymer increases in strength and stiffiess as the polymer cures upon extended exposure to an elevated temperature during its cure cycle. This curing reaction would limit adhesive flow in the latter stages of forming, a time when flow is desired to fill the interstices of the panel structure. The thermoplastic polymer should also exhibit good thermal stability in the temperature-time-strain rate window of the superplastic alloy. In general, the necessary SPF temperature will be toward the upper temperature range of available thermoplastic adhesive systems (e.g., polyetheramide has an upper exposure temperature of approximately 400° C. for 1 hour). Adhesive LaRC 8515 has been identified as an attractive candidate adhesive. It is a PETI-5-type polyimide resin available from IMITEC. PETI-5-type resins are described, for example in U.S. Pat. Nos. 5,817,744; 5,645,925; and 5,116,935.

The adhesive should have a moderate viscosity at elevated temperatures to achieve the desired flow during the SPF/AB cycle. It should bond well with the selected metal alloy. A commercially available material is essential if the SPF/AB process is to be economically viable.

Selection of an Alloy System

For adhesive bonding, the alloy should be superplastic at relatively low temperatures to avoid degradation of the adhesive. It should also not require solution treatment and water-quenching following forming. For commercially available superplastic alloys, this limits the alloy choices to Al 8090 or Al 2004. An exciting new development in the aluminum industry is the Al—Mg—Sc alloy. A Russian version of this alloy, designated Al 1570 (Al-6Mg-0.3Sc), is supexplastic at 400–475° C. Furthermore, this alloy is weldable and requires no post-forming heat treatment. The ability to weld is important because welding (e.g., laser) joins the core sheets in the desired rib geometry. Both Al 8090 and Al—Mg—Sc (i.e., Al 1570) exhibit mechanical properties comparable to Al 2024-T3, but are about 5% lower in density. Alloy 8090 is considerably stiffer.

The success of the SPF/AB process relies on the ability to achieve a relatively low SPF temperature. Pu and Wuang demonstrated superplasticity in Al 8090 aluminum alloy at 350–450° C., and NASA-LaRC corroborated this finding in unpublished work. The cost of Al 8090, however, makes it unattractive currently unless widescale implementation can reduce its cost.

A preferred alloy for use in the SPF/AB process should be commercially available, superplastic at low to modest temperatures, possess attractive mechanical properties, and be quenchable in air from the forming temperature to ambient.

Because of the high cost of Al 8090, we decided to prepare test panels using superplastic Al 2004 core sheets with non-superplastic Al 2024 face sheets (i.e., 2024/2004). Al 2004 cannot be quenched in air, which is a drawback. It is a standard aerospace alloy, however, with suitable SPF properties (i.e., the SPF temperature range and strain rate range), and is readily available at relatively low cost. It is resistance weldable. The results of our tests for Al 8090 and Al 2004 are summarized in Table 1.

TABLE 1

Forming Trials

| Trial # | Alloy | Face Sheets | Core Sheets | Panel Configuration | Rib Pattern | Welding Method | Results |
|---|---|---|---|---|---|---|---|
| 1 | 8090 | — | 0.080" | Core-only | Parallel | Laser | Slight FZ tearing |
| 2 | 8090 | — | 0.080" | Core-only | Parallel | Laser | Significant tearing at FZ |
| 3 | 8090 | 0.080" (preformed) | 0.080" (preformed) | Four-sheet | Parallel | Laser | Slight FZ tearing |
| 4 | 8090 | — | 0.080" | Core-only | Parallel | Laser | Leaked |
| 5 | 8090 | — | 0.040" | Core-only | Parallel | Laser | Laser |
| 6 | 8090 | 0.080 | 0.040" | Four-sheet | Parallel | Laser | Significant tearing at FZ |
| 7 | 2004 | — | 0.032" | Core-only | Parallel | Resistance (0.25") | 1 of 2 fully formed |
| 8 | 2004 | — | 0.032" | Core-only | Rectangular | Resistance (0.25") | Leaked |

TABLE 1-continued

Forming Trials

| Trial # | Alloy | Face Sheets | Core Sheets | Panel Configuration | Rib Pattern | Welding Method | Results |
|---|---|---|---|---|---|---|---|
| 9 | 2024/ 2004 | 0.020" | 0.032" | Four-sheet | Parallel | Resistance (0.15") | Fully formed but trapped gas |
| 10 | 2004 | — | 0.032" | Core-only | Parallel | Resistance (0.15") | Fully formed |
| 11 | 2024/ 2004 | 0.020" | 0.032" | Four-sheet | Parallel | Resistance (0.15") | Fully formed |

Another important aspect of the SPF/AB process is the ability to achieve a structural bond with the chosen adhesive and alloy combination, and to determine the time and temperature limits imposed by the adhesive. A gradual decrease in strength may occur with increasing time to form the bond for times extending beyond about 30 minutes. Temperature has an important effect on strength, and it is clear that forming should be accomplished below 425° C. (800° F.). We have not yet determined what the minimum required bond strength is to provide adequate panel performance.

An existing 12"×12" HN steel die containing a 10"×10"× 0.5" cavity (50% split line) was used for forming trials. All the forming trials were conducted in a Murdock 225 T SPF press with a computer-controlled argon gas feed system. Laser welding was accomplished with a Convergent Energy 1700 W $CO_2$ [tungsten carbon dioxide] continuous wave system. A series of laser welds in a desired lap geometry were produced over a range of power settings and travel speeds in the 0.080" sheet. Adequate penetration was achieved at 1650 W and 50 inches/min. A core pattern was developed to establish the rib structure in the formed panel. It consisted of five parallel beads at 1.5-inch spacing. This geometry was adopted for all forming activities.

For the first trials, we produced two core-only packs to reduce the risk of losing labor and material because of a pack leak. These core-only packs also allowed the visual observation of forming progress by opening the die at selected intervals. During welding, some porosity defects were observed on the weld crown at discrete locations. Forming was conducted at nominally 750° F. with a maximum gas pressure of 400 psi over a period of 2 hours. The first pack formed adequately while a second pack failed at a weld defect on one side.

The partially-formed core pack from trial #1 was assembled in a sandwich configuration with preformed face sheets and 0.002" film of LaRC 8515 adhesive. The edges were clamped prior to insertion into the die. Forming was completed at 750–775° F. within 45 minutes. The formed panel was removed from the die, vented, and fan cooled from 600° F. to room temperature.

The thickness of the sheet probably was promoting failure by requiring large welding heat input and forming pressures. Therefore, four 0.080 inch 8090 alloy sheets were chemically milled to a final gage of 0.040 inch. The resulting core packs were notably easier to weld, with fewer visible defects. Upon forming the thinned sheets, a leak occurred, apparently at a weld.

We next tried to produce a four-sheet SPF/AB panel without performing, i.e. in a single process step. The 0.040 inch core sheets were welded and appeared visually sound. The sheets were assembled with 0.004 inch adhesive film per bond zone. The multisheet pack was loaded into the press. A thicker sheet of adhesive may be desirable. Forming was conducted over a one-hour period at approximately 775° F. and appeared to go to completion. Further examination of the panel interior, however, revealed that the greater portion of the vertical ribs had fractured during forming in the weld fusion zone.

Another core pack was laser welded, this time utilizing four Al 8090 sheets that had been chemically milled from 0.080 inch to 0.060 inch gage. Because welds in the 0.040" gage sheets could not sustain the forming pressure loads, we hoped that increasing the gage to 0.060 inch might provide adequate section thickness to avoid tearing. The first pair of sheets was used to establish weld parameters by producing welds over a range of powers, travel speeds, jet standoff and gas flow rate. A 2.5 inch focal length lens with a coaxial jet orifice (orifice size of 0.2 inch) was used. The results are shown in Table 2.

TABLE 2

Welding Parameter Evaluation for 0.060" 8090 Chemically Milled Sheets in Single Lap Joint Geometry

| Test # | Power (W) | Speed (in/min) | Gas Type/ Flow Rate ($ft^3$/hr) | Gas Orifice Standoff (in) | Result |
|---|---|---|---|---|---|
| 1 | 800 | 60 | Ar/35 | 0.6 | Partial penetration/ no flaws |
| 2 | 800 | 60 | He/35 | 0.6 | Partial penetration/ no flaws |
| 3 | 800 | 60 | He/45 | 0.6 | Partial penetration/ no flaws |
| 4 | 900 | 60 | He/35 | 0.6 | Partial penetration/ 2 small craters |
| 5 | 900 | 60 | He/45 | 0.6 | Partial penetration/ multiple craters |
| 6 | 1000 | 60 | He/35 | 0.6 | Partial penetration/ 2 small craters |
| 7 | 1110 | 60 | He/35 | 0.6 | Partial penetration/ 1 crater |
| 8 | 1110 | 60 | He/45 | 0.6 | Partial penetration/ multiple craters |
| 9 | 1240 | 60 | He/35 | 0.6 | Semi-penetration/ 1 crater |
| 10 | 1240 | 40 | He/35 | 0.6 | Full penetration/ no flaws |
| 11 | 900 | 60 | He/45 | 0.2 | Partial penetration/ few small craters |
| 12 | 900 | 60 | He/35 | 0.2 | Partial penetration/ 2 small craters |
| 13 | 1100 | 60 | He/35 | 0.2 | Partial penetration/ 3 craters |
| 14 | 1100 | 60 | He/45 | 0.2 | Partial penetration/ many craters |
| 15 | 1200 | 40 | He/45 | 0.2 | Partial penetration/ many craters |
| 16 | 1400 | 60 | He/35 | 0.2 | Full penetration/ craters and holes |

A refined process will optimize the welding of the aluminum sheets to define the core geometry to eliminate weld defects, optimize the thermal and pressure cycle for concurrent SPF/AB, and optimize the adhesive thickness for the desired application. Such refinement should make the SPF/AB process acceptable for making aerospace aluminum multisheet sandwich panels. While the forming temperature range for Al 8090 is quite wide (600–975° F.), the maximum strain achievable depends on temperature. A moderate amount of strain (~50%) is required to fully form the cells and to close down on the adhesive on the internal panel surfaces. Since the maximum time at temperature is limited for the LaRC 8515 adhesive, an optimal set of forming conditions needs to be identified that maximizes both bond strength and forming strain.

Recent work suggests that it may prove possible to use 5xxx or 6xxx series lauminum alloys in some situations.

The preferred process can be performed over the range of conditions shown in Table 3.

TABLE 3

Design-of-Experiments Test Matrix for SPF/AB with 8090 and LaRC 8515

| | Variables | | | |
|---|---|---|---|---|
| Run # | Temp (F.) | Time (min) | Adhesive Amount (sheets) | Final Pressure (psi) |
| 1 | 675 | 45 | 1 | 150 |
| 2 | 800 | 45 | 1 | 250 |
| 3 | 675 | 60 | 1 | 250 |
| 4 | 800 | 60 | 1 | 150 |
| 5 | 675 | 45 | 3 | 250 |
| 6 | 800 | 45 | 3 | 150 |
| 7 | 675 | 60 | 3 | 150 |
| 8 | 800 | 60 | 3 | 250 |

Surface preparation appears to have a dominant effect on ultimate bond strength. To arrive at the optimal surface preparation, we conducted the experiments outlined in Table 4.

TABLE 4

Surface Treatment Conditions

| ID | Substrate | Size | Surface Treatment | Primer | Adhesive | Number-Type Tests |
|---|---|---|---|---|---|---|
| D51-1N | 8090 Al-Li | 6 × 4 × 0.06" | Deox. Only (Amchem 6-16) | none | Larc 8515 (1 sheet) | 3–75° F. lap shears 2–350° F. lap shears |
| D51-2N | 8090 Al-Li | 6 × 4 × 0.06" | Deox. + Phos. Acid Anodize (PAA) | none | Larc 8515 (1 sheet) | 3–75° F. lap shears 2–350° F. lap shears |
| D51-3N | 8090 Al-Li | 6 × 4 × 0.06" | Deox. + Chrom. Acid Anodize (PasaJell 105) | none | Larc 8515 (1 sheet) | 3–75° F. lap shears 2–350° F. lap shears |
| D51-4N | 8090 Al-Li | 6 × 4 × 0.06" | Deox. + Zr/Amine Sol Gel (Boegel-AM) | none | Larc 8515 (1 sheet) | 3–75° F. lap shears 2–350° F. lap shears |
| D51-1P | 8090 Al-Li | 6 × 4 × 0.06" | Deox. Only (Amchem 6-16) | BRX5* | Larc 8515 (1 sheet) | 3–75° F. lap shears 2–350° F. lap shears |
| D51-2P | 8090 Al-Li | 6 × 4 × 0.06" | Deox. + Phos. Acid Anodize | BRX5* | Larc 8515 (1 sheet) | 3–75° F. lap shears 2–350° F. lap shears |
| D51-3P | 8090 Al-Li | 6 × 4 × 0.06" | Deox. + Chrom. Acid Anodize (PasaJell 105) | BRX5* | Larc 8515 (1 sheet) | 3–75° F. lap shears 2–350° F. lap shears |
| D51-4P | 8090 Al-Li | 6 × 4 × 0.06" | Deox. + Zr/Amine Sol Gel (Boegel-AM) | BRX5* | Larc 8515 (1 sheet) | 3–75° F. lap shears 2–350° F. lap shears |

Lap shears are per Boeing Specification BSS7202 with a scrim cloth to promote consistency. All bonding cure cycles shall be 1 hour/700° F./85 psi. BRX5 is a polyimide-based primer and requires a 350° F./1-hour pre-cure.

Table 5 summarizes the results we have measured to date for our test specimens.

TABLE 5

Ultimate Load & Ultimate Stress Results

| ID | Test Temperature (° F.) | Thickness (inches) | Width (inches) | Area (sq. in.) | Ultimate Load (lbs) | Ultimate Stress (psi) | Average Ultimate Stress (psi) |
|---|---|---|---|---|---|---|---|
| D51-1N | | | | | | | |
| D51-2N | | | | | | | |
| D51-3N | RT (72) | 0.105 | 1.000 | 0.5 | 401.6 | 803.2 | 704.3 |
| | RT (72) | 0.105 | 1.000 | 0.5 | 284.5 | 569.0 | |
| | RT (72) | 0.102 | 1.000 | 0.5 | 370.3 | 740.6 | |
| | 350 | 0.105 | 1.000 | 0.5 | 0.0 | 0.0 | 2.0 |
| | 350 | 0.106 | 1.000 | 0.5 | 2.0 | 4.0 | |
| D51-4N | RT (72) | 0.101 | 1.000 | 0.5 | 534.1 | 1068.2 | 1067.5 |
| | RT (72) | 0.101 | 1.000 | 0.5 | 543.9 | 1087.8 | |
| | RT (72) | 0.102 | 1.000 | 0.5 | 523.3 | 1046.6 | |
| | 350 | 0.102 | 1.000 | 0.5 | 517.0 | 1034.0 | 1043.0 |
| | 350 | 0.102 | 1.000 | 0.5 | 526.0 | 1052.0 | |
| D51-1P | RT (72) | 0.104 | 1.000 | 0.5 | 489.1 | 978.2 | 786.9 |
| | RT (72) | 0.104 | 1.000 | 0.5 | 326.7 | 653.4 | |
| | RT (72) | 0.102 | 1.000 | 0.5 | 364.5 | 729.0 | |
| | 350 | 0.104 | 1.000 | 0.5 | 290.3 | 580.6 | 583.4 |
| | 350 | 0.104 | 1.000 | 0.5 | 293.1 | 586.2 | |
| D51-2P | RT (72) | 0.103 | 1.000 | 0.5 | 461.5 | 923.0 | 983.5 |
| | RT (72) | 0.106 | 1.000 | 0.5 | 550.7 | 1101.4 | |
| | RT (72) | 0.104 | 1.000 | 0.5 | 463.1 | 926.2 | |
| | 350 | 0.106 | 1.000 | 0.5 | 332.2 | 664.4 | 729.6 |
| | 350 | 0.106 | 1.000 | 0.5 | 397.4 | 794.8 | |
| D51-3P | RT (72) | 0.104 | 1.000 | 0.5 | 380.5 | 761.0 | 800.8 |
| | RT (72) | 0.104 | 1.000 | 0.5 | 395.2 | 790.4 | |
| | RT (72) | 0.102 | 1.000 | 0.5 | 425.5 | 851.0 | |
| | 350 | 0.104 | 1.000 | 0.5 | 275.9 | 551.8 | 523.6 |
| | 350 | 0.102 | 1.000 | 0.5 | 247.7 | 495.4 | |
| D51-4P | RT (72) | 0.105 | 1.000 | 0.5 | 597.3 | 1194.6 | 1195.9 |

TABLE 5-continued

Ultimate Load & Ultimate Stress Results

| ID | Test Temperature (° F.) | Thickness (inches) | Width (inches) | Area (sq. in.) | Ultimate Load (lbs) | Ultimate Stress (psi) | Average Ultimate Stress (psi) |
|---|---|---|---|---|---|---|---|
| | RT (72) | 0.101 | 1.000 | 0.5 | 580.0 | 1160.0 | |
| | RT (72) | 0.101 | 1.000 | 0.5 | 616.6 | 1233.2 | |
| | 350 | 0.100 | 1.000 | 0.5 | 459.0 | 918.0 | 958.0 |
| | 350 | 0.101 | 1.000 | 0.5 | 499.0 | 998.0 | |

*D51-1N and D51-2N broke upon removal from the autoclave.

We incorporate Interim Report "Superplastic Forming/Adhesive Bonding of Multisheet Metallic Panel Structures," MIST contract NASI-20014, Task Order No. 38, Dec. 1, 1998, by reference.

Further improvement might arise by carrying out the SPF/AB process in Boeing's induction heating workcell, because the pack can be heated and cooled rapidly to protect the adhesive by limiting the duration of its exposure to high temperatures.

I. THE INDUCTION HEATING WORKCELL

The basic induction heating process is described in considerable detail in U.S. Pat. No. 4,622,445, which we incorporate by reference. Nevertheless, we will briefly describe that equipment and its basic operation. A more detailed description will then follow with respect to the illustrative preferred embodiments for combined cycles.

Fundamentally, the induction heating workcell is a manufacturing tool capable of providing controlled heating and pressure to a workpiece mounted in the workcell to accomplish manufacturing operations including, e.g., forming, superplastic forming, brazing, diffusion bonding, consolidating, curing, welding, bonding, annealing, or heat treating. Several operations can be combined into a single heating cycle for further productivity and efficiency. The workpiece can be isolated from the surrounding environment, usually by confining the workpiece within a metal envelope or bagging system, particularly like that described in U.S. Pat. Nos. 5,599,472; 5,645,744; or 5,747,179.

The workcell includes a pair of dies preferably formed from a dielectric thermally insulating (i.e., relatively poor heat conducting), castable ceramic. The workpiece is positioned between the dies. The base of the workcell includes four columns at corners of the dies. The upper or lower die conveniently may be rigidly mounted on the column through a jackscrew and threaded bore arrangement while the other die might float freely on the columns with bushings or other suitable means sliding over the outer dimensions of the columns. If free floating, then, appropriate nuts can be carried on the threaded portion of the jackscrews to stop motion of the dies in the desired location. In this way, the workcell can open to allow the workpiece to be positioned within the dies or withdrawn and can clamp on the workpiece to apply some of the pressure that we desire in the manufacturing operation or operations that we will complete in the workcell. Typically the dies are carried in metal strongbacks that actually are carried on the columns since the metal strongbacks are more durable. The strongbacks also allow the changing of dies relatively easily so that we can perform different operations requiring different dies with agility (i.e., significantly reduced machine setup or change delays). The strongback provides a stiff, flat surface backing the ceramic die to transfer the load applied through the columns evenly to the die. The strongback should have sufficient rigidity to keep the ceramic die from bending and cracking and, therefore, should hold the die rigid to a surface variation or tolerance under the applied pressure/stress of +0.003 in/ft$^2$ of die surface.

Each die contains a portion of the induction coil that we use to heat the workpiece. The induction coil, therefore, actually surrounds the workpiece and includes the several, spaced, parallel, straight coil segments embed in the dies plus peripheral jumper segments. The embedded coil segments are typically copper tubing. The copper carries the current that we use to create the oscillating, magnetic field that functions as our heat source. Coolant, usually water, circulates in the tubing to control the temperature of the tubing and the surround die. Although illustrated as circular pipe, the shape of the tubing is not critical. We also use rectangular channels.

At the edges of the dies, fittings on the tubing transition the embedded coil to insulated copper jumpers enclosed within a fluid-tight, flexible jacket. Here, the jumpers carry the current while the jacket carries the coolant. This jumper arrangement permits a range of travel between the dies of 3 inches or more. Other jumper/coolant arrangement might also be used.

The coil connects with a coil driver that supplies the power we desire to accomplish heating of the part. Typically, the power is anywhere up to about 400 kW at between about 3–10 kHz to create an oscillating magnetic field around the workpiece of high field strength and substantial uniformity. Temperature uniformity in the workpiece corresponds with the uniformity of the field to a great extent so we try to create a field that at any moment in time is the same throughout the volume of space within the coil. A uniform temperature in the workpiece ensures that all portions of the part are properly heated when we initiate a manufacturing operation, particularly forming or SPF. Also, a uniform field means that all portions of the workpiece will heat uniformly because they experience the same driver.

Tool inserts within the ceramic dies might achieve even greater flexibility in operation by further reducing the mass of the die portions that are replaced during tool changes. Such tool inserts are ceramic blocks having faces shaped to the final part configuration and backing surfaces are designed for a friction fit alignment with corresponding surfaces fabricated into the corresponding die.

Each die is supported around its periphery with a compression frame that we usually mold from phenolic resin, dielectric beams. Each die also includes preloaded, reinforcing tie rods that are held between the corresponding frames in both the lateral and transverse directions. In this way, the compression frame functions to apply a compressive force to the ceramic. Furthermore, the frame defines the border of the die when the ceramic is cast

II. A COMBINED SPF AND ADHESIVE BONDING CYCLE

Combining superplastic forming with adhesive bonding of the individual sheets of a multisheet pack in one thermal operation provides significant manufacturing cost advantage while reliably producing complex multisheet SPF/AB parts, especially for aluminum alloys. Eliminating diffusion bonding eliminates the uncertainties of structural integrity that worry manufacturers. We can form an adhesive bond quickly and reliably at lower pressures and significantly shorter processing times than a corresponding diffusion bond. The adhesive also fills any tunnel voids.

An idealized temperature-pressure cycle for a preferred SPF/adhesive bonding process of the present invention includes three processing zones. The multisheet pack is loaded to the SPF workcell (i.e., "press") and is heated inductively to the superplastic forming temperature for the pack. The gas manifold and gas control system of the press creates differential pressure as the driving force in the pack to form the SPF parts with a preselected core cell geometry. In this step, the pack typically has sheets that are expanded to form a web, truss, or "honeycomb" structure between outer face sheets that may be formed or that may remain flat, as appropriate for the particular part being manufactured. Those skilled in the art of SPF manufacturing will understand how particular parts can be designed and laid up into the packs with suitable gas zones to produce the desired final shape.

The SPF process also defines the location of adhesive bonds in the finished part When assembling the pack, adhesive is affixed to the sheet metal sheets. The adhesive is selected to flow at the SPF forming temperature of the pack sheet metal so that the forming and bonding occurs concurrently in a single thermal cycle.

Finally, the heating is stopped and the part is allowed to cool below the SPF temperature, and the finished part is removed from the press.

Oscillating current in the induction coil within the ceramic dies creates a time-varying magnetic field that couples electromagnetically with the metallic pack to heat the pack rapidly by inducing eddy currents in the pack. The ceramic dies are a natural refractory material that has a low heat transfer coefficient and are an effective thermal insulation; they surround the pack. The induction only creates eddy currents in the outer sheets. The pack and the dies hold the heat produced by induction in these sheets. Energy is not wasted in heating a huge thermal mass otherwise typical for conventional SPF presses. The forming operation can proceed more quickly between tool changes or setup as occurs frequently in agile aerospace production where parts are manufactured at low rates (e.g., 20/mon) with short production runs. The Boeing workcell is particularly well suited to rapid prototyping.

The details of the SPF/AB process will next be discussed with reference to forming a four sheet aluminum honeycomb part. Such a part includes two sheets that constitute the core material and two face sheets that sandwich the core material. The four sheets constitute "a pack."

The core sheets material are welded (or joined in any other appropriate manner) in selected locations to join them in a pattern appropriate to form the desired core cell geometry (i.e., web, truss, honeycomb, etc.). Typically the core material is about 0.040–0.060 inch thick sheet metal. We often use resistance or laser welding and may use stopoff material (i.e., a release agent) wherever the core material sheets are not welded together. We prefer to do without stopoff. The core material is welded around essentially its entire periphery, leaving appropriate gas inlets for the forming gas/differential pressure.

An adhesive film (0.001 in thick) underlies each face sheet. The core is sandwiched between the face sheets with the adhesive film in contact with the core material. The face sheets may be welded substantially around their periphery (leaving the gas inlets, of course) to complete the pack. When we weld, we generally use an edge band doubler weld. The sheet metal stock is oversized to accommodate the welds and to allow trimming to produce the final, finished part.

A vacuum line into the pack allows evacuation or pressurizing of the volume between the face sheets where the core materials lay. The differential pressure zones necessary for the SPF forming are also laid out at this time, as those skilled in the art will understand.

The pack is sandwiched, in turn, between two sheets that are welded or otherwise sealed around their periphery (leaving appropriate gas inlets to form a retort. As an alternative to welding, we can use the sheet sealing system that we described in U.S. Pat. No. 5,599,472. In that system, we machine or form grooves around the periphery of the sheets and seat a sealing gasket in the groove so that the dies create a compression seal on the pack when they engage it. The sheets of the retort are coated on their inner sides with a release agent like boron nitride to keep the part from sticking to the retort. The retort sheets can be selected so that their Curie point is high enough to facilitate the forming and brazing operations. As those of ordinary skill understand, the Curie point is a measure of the magnetic permeability of the ferromagnetic material used as the susceptor, so a judicious selection of the retort sheet material is necessary. For titanium, we typically use 1008 steel or copper. For aluminum, we use 1100 aluminum alloy.

The weld around the retort sheets defines an internal volume or cavity for the pack. At least one gas line permits evacuating or pressurizing this volume which surrounds the pack. Typically we purge both the retort cavity and the pack cavity with argon gas or another suitable inert gas.

The retort usually is coated with boron nitride and EVERLUBE, ceria, graphite, mixtures thereof, or another appropriate release agent (ie., a 'stopoff') on its outer surfaces to ensure that the retort does not stick to the dies.

We load the retort into the SPF press and connect the gas lines 108. With induction heating, we rapidly heat the retort and pack until they reach SPF forming temperature. With our press, we can heat the part at a rate of about 165° F./min (92° C./min). During this heating stage, we prefer to purge the pack cavity with argon.

At the forming temperature, we ramp up the pressure to apply the differential pressure that will form the part. The differential pressure and the forming temperature are maintained for the proper time (typically 40 min) while the part stretches superplastically into the configuration of the die and the core material expands to define the desired core material cell geometry. The differential pressure ensures that this sandwich brings the core material into intimate contact with the adhesive.

We turn off the induction coil and achieve a cooling rate of about 60° F./min (33° C./min). We reduce the differential pressure as well. When the retort cools below the superplastic forming range, we remove the retort from the die. We cut away the retort leaving the finished part for trimming and fitting.

The ceramic die faces usually are coated with a release agent as well to keep the retort from sticking to the die. We manufacture the dies to conform to the desired final configuration of the completed part, accounting for relaxation as appropriate.

The rate and magnitude at which we apply pressure to superplastically form the intermediate to the appropriate final part geometry is dependent upon the part geometry. The forming time is typically on the order of 30 minutes although the time can vary widely depending upon the part's complexity, criticality, and geometry.

The process can be used, for example, for making satellite heat radiators.

While we have described preferred embodiments, those skilled in the art will recognize alternatives, modifications, or variations that might be made without departing from the inventive concept. The examples illustrate the invention and are not intended to limit it. Therefore, the description and claims should be interpreted liberally with only such limitation as is necessary in view of the pertinent prior art.

We claim:

1. A process for superplastically forming and adhesively bonding a multisheet pack having core and face sheets, comprising the steps of:

(a) assembling a multisheet pack wherein the core is laser welded in selected locations and adhesive sheets are placed between the core and face sheets;

(b) enclosing the pack in a susceptor;

(c) loading the pack and susceptor to an induction heating press;

(d) heating the susceptor inductively to heat the pack; and (e) superplastically forming the core while adhesively bonding at least some of the sheets.

* * * * *